United States Patent [19]

Creed

[11] Patent Number: 4,962,337
[45] Date of Patent: Oct. 9, 1990

[54] EXPRESS WINDOW LIFT MOTOR SHUTDOWN

[75] Inventor: Brian T. Creed, Batavia, Ill.

[73] Assignee: Eaton Corporation, Cleveland, Ohio

[21] Appl. No.: 485,809

[22] Filed: Feb. 23, 1990

Related U.S. Application Data

[63] Continuation of Ser. No. 175,819, Mar. 3, 1988, abandoned.

[51] Int. Cl.⁵ ............................ E05F 15/16; H02P 1/22
[52] U.S. Cl. .................................... 318/280; 318/266; 318/267; 318/286; 318/469; 49/28
[58] Field of Search ............... 318/256, 264, 265, 266, 318/280, 282, 286, 430, 434, 466, 467, 468, 469, 470, 267; 49/26, 28; 307/9.1, 10.1

[56] References Cited

U.S. PATENT DOCUMENTS

| | | | |
|---|---|---|---|
| 4,001,661 | 1/1977 | Terabayashi | 318/264 |
| 4,048,662 | 9/1977 | Burguburu | 318/469 X |
| 4,260,938 | 4/1981 | Joyes | 318/434 |
| 4,296,450 | 10/1981 | Paice et al. | 340/310 R X |
| 4,309,735 | 1/1982 | Morris | 318/434 X |
| 4,373,149 | 2/1983 | Coste | 318/264 X |
| 4,394,605 | 7/1983 | Terazawa | 318/469 X |
| 4,471,300 | 9/1984 | Harnden, Jr. et al. | 324/127 |
| 4,476,416 | 10/1984 | Licata et al. | 318/286 X |
| 4,502,004 | 2/1985 | Schindler | 324/127 X |
| 4,536,686 | 8/1985 | Gartner | 318/434 |
| 4,561,691 | 12/1985 | Kawai et al. | 49/28 X |
| 4,562,387 | 12/1985 | Lehnhoff | 318/265 X |
| 4,628,234 | 12/1986 | Mizuta et al. | 318/469 X |
| 4,686,598 | 8/1987 | Herr | 29/28 X |
| 4,745,391 | 5/1988 | Gajjar | 340/310 A |

Primary Examiner—Bentsu Ro
Attorney, Agent, or Firm—R. A. Johnston

[57] ABSTRACT

A circuit for controlling bi-directional operation of a vehicle window lift motor having a toroidal coil sensing counter-emf perturbations in the motor current line. An EXPRESS mode switch, upon momentary actuation, latches an electronic switch to operate a relay to provide continuous motor rotation for lowering the window. Subsequent momentary switch actuation unlatches the electronic switch to cut interrupt window motor current. Window lift motor stall is detected by a toroidal coil which senses loss of motor line perturbations and unlatches the electronic switch to open circuit the motor relay.

5 Claims, 2 Drawing Sheets

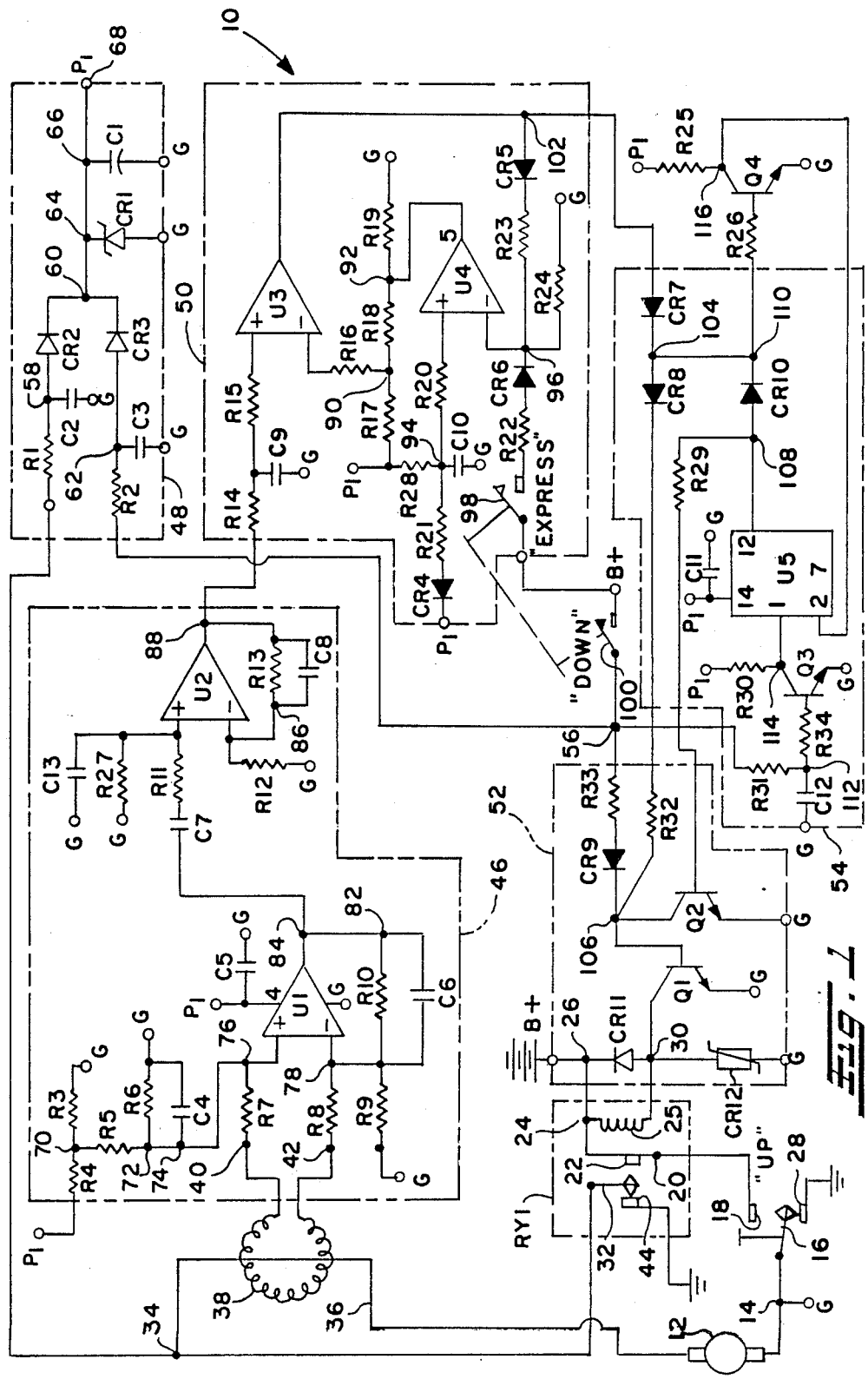

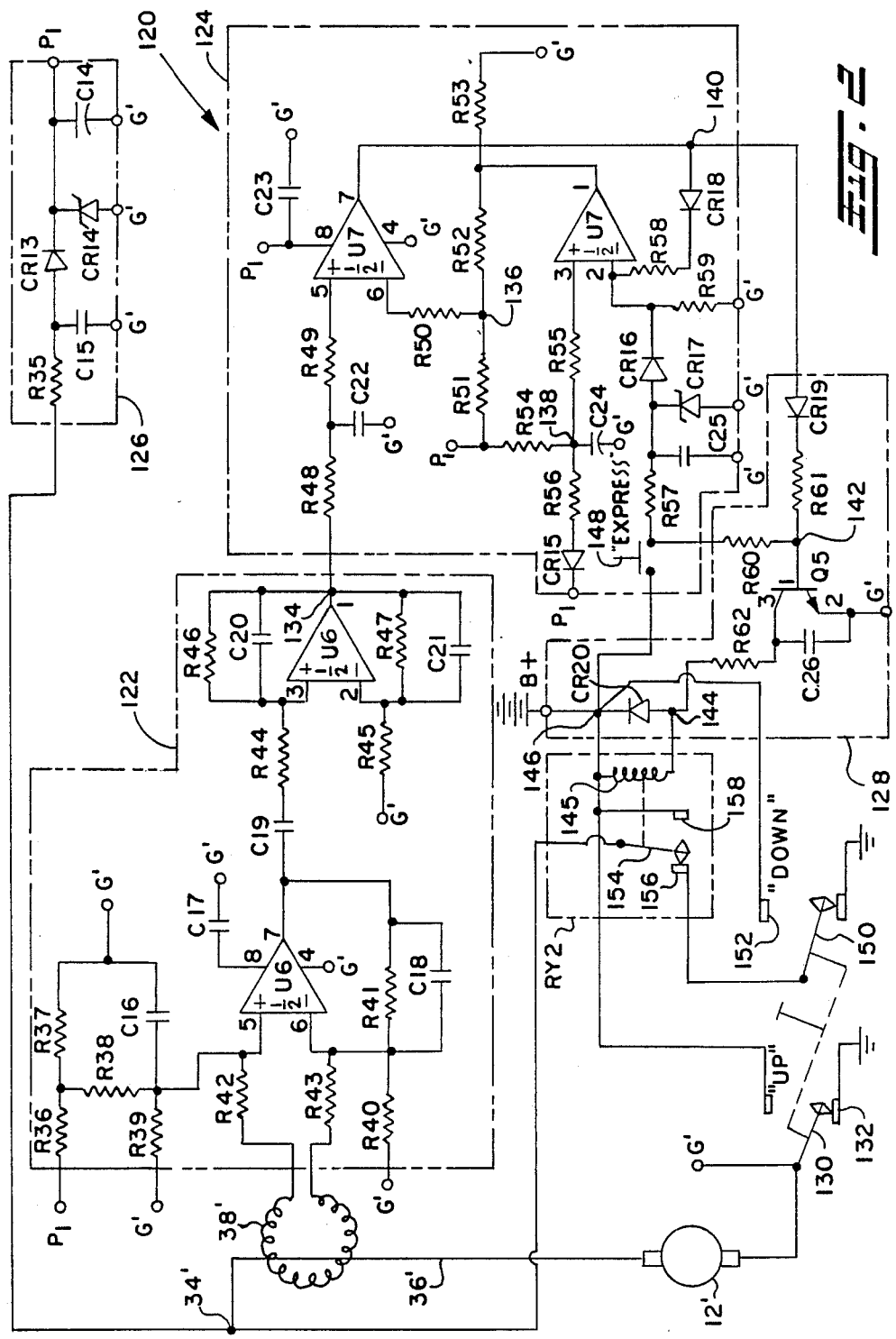

EXPRESS WINDOW LIFT MOTOR SHUTDOWN

This application is a continuation, of application Ser. No. 175,819, filed Mar. 31, 1988, now abandoned.

BACKGROUND OF THE INVENTION

The present invention relates to control systems and circuitry for operation of power-lift windows employed in motor vehicles. Typically, such power-lift or motorized windows are activated by driver or passenger actuation of a manual control switch from a neutral or center position to one of two side positions for moving the window either from the closed to the opened position or from the open to the closed position. The most common arrangement of the window motor switch utilizes a spring loaded actuator member which returns the switch to the neutral or OFF position when the operator's manual pressure on the actuator, for holding the switch in a side position, is released. Upon release of the switch actuator member, current is stopped to the motor and consequently movement of the window is terminated.

It has been found desirable to provide a function mode for the window lift motor operation in which the driver need only momentarily actuate the switch to initiate continuous motor running to lower the window to its fully open position, thereby eliminating the need for the driver to keep one hand on the switch actuator for more than a brief moment. If only momentary actuation of the window motor switch is required, the driver thus has one hand free to reach for a toll card, currency or other items needed for various reasons. Thus, it has been desired to provide a functional mode at operation of vehicle power-lift windows in which the driver need only momentarily actuate the motor switch to initiate continuous motor operation for lowering the window to the fully open position; and, such a functional mode of operation is referred to as "EXPRESS" window operation.

Where the aforesaid EXPRESS window lift motor operation is desired in a vehicle, it has been found particularly troublesome and costly to provide a way or means of sensing the lower limit condition of the window movement and thereupon automatically providing for shut-OFF of current to the window lift drive motor. Heretofore, a known technique for sensing the lower limit or fully open position of the window has employed a means for sensing the increase in motor current as the motor approached stall when the window movement mechanism contacted the limit stop in the fully lowered or open position. This aforesaid technique of permitting the motor current to rise significantly in order that motor stall can be detected, has resulted in prohibitively high loads on the window lift actuating mechanism and decreased window lift motor life. It has thus been desired to find a way of lower limit position operation of a vehicle window in a manner which prevented a substantial increase in motor current upon the motor stalling as the window came to rest against the lower limit stop.

SUMMARY OF THE INVENTION

The present invention provides a control system and circuitry for operation of window lift motors employed in opening and closing the passenger compartment windows in motor vehicles; and, particularly relates to controlled systems providing for EXPRESS function mode or continuous operation of the window lift drive motor to the fully open limit position. The present invention employs a toroidal coil having a motor current conductor passing therethrough for sensing motor rotor-induced current perturbations on the motor current line. Such perturbations induced by the rotation of the rotor in the window lift drive motor cease immediately upon the motor rotor encountering a stall condition. The cessation of the signal in the coils caused by stall conditions of the motor rotor is amplified and sensed by a comparator which triggers an electronic switch in the circuitry to cut OFF motor current.

BRIEF DESCRIPTION OF THE DRAWINGS

FIG. 1 is a schematic representation of the control circuit for one embodiment of the present invention; and, FIG. 2 is a schematic of the circuitry for an alternate embodiment of the present invention.

DETAILED DESCRIPTION

Referring to FIG. 1, a first embodiment of the control circuit is indicated generally at 10 as having a load function or window-lift motor 12 operatively connected to raise and lower a vehicle door window (not shown) or other function requiring two-way motor rotation. Motor 12 has one power lead thereof connected to junction 14 which has a connector indicated by the reference character G, and the common terminal of switch 16 connected thereto.

In the presently preferred practice, switch 16 is adapted for manual actuation by user movement of a switch actuating member (not shown) to one side for imparting motor operation in a direction so as to raise the vehicle window. One closed-circuit contact 18 of the switch 16 is thus labeled by the designation "UP" in FIG. 1 with the opposite contact 28 of the switch connected to the vehicle battery ground. Contact 18 is connected to terminal 20 of relay RY1 which has a stationary switch contact 22 connected thereto and which is also connected to relay coil 25 through terminal 24 which is connected to the B+or battery supply voltage through junction 26. Relay coil 25 has the side thereof connected to junction 30 which is also connected through diode CR11 to junction 26, through transient suppressor CR12 to terminal G and to the collector terminal of tranistor Q1 which has an emitter thereof connected to terminal G. Relay RY1 has a switch 32 with the common terminal thereof connected to junction 34 which is connected through lead 36 to the opposite terminal of motor 12.

Motor lead 36 passes through the central region of a toroidal coil 38 which has one lead thereof connected to junction 40 and the remaining lead connected to junction 42. Switch 32 of relay RY1 has the opposite terminal 44 thereof connected to the vehicle battery ground.

As shown in FIG. 1, the portion of the control circuit 10 enclosed by the dashed outline indicated by reference numeral 46 comprises an amplification portion of the circuit. The portion enclosed by the dashed outline indicated by the reference numeral 48 comprises a power supply for providing the regulated voltage $P_1$; and, the portion of the circuit surrounded by, the dashed outline denoted 50 comprises the detect latch and timeout function portions of the circuit. The section enclosed by the dashed outline 52 comprises the relay drive portion of the circuit. Whereas, the portion of the circuit of FIG. 1 enclosed in dashed outline and denoted by the reference numberal 54 comprises the "EXPRESS" interrupt portion of the circuit.

Power supply 48 receives B+voltage from junction 34 and from junction 56 which is connected through manually actuated "DOWN" switch which receives power, when closed, from the battery voltage B+.

The voltage from junction 34 is applied through resistor R1 to junction 58 and through diode CR2 to junction 60. The voltage from DOWN switch junction 56 is applied through resistor R2 to junction 62 and through diode CR3 to junction 60. Junction 60 is connected to junction 64 which is connected to ground terminal G through Zener diode CR1 and to junction 66 which is also connected through capacitor C1 to ground terminal G; and, the voltage at junction 66 is connected to junction 68 and capacitor C1 and is denoted as voltage $P_1$.

The amplification section 46 receives the voltage $P_1$ through resistor R4 to junction 70 which is connected through resistor R3 to ground terminal G and also through resistor R5 to junction 72. Junction 72 is connected through resistor R6 to ground terminal G and also to junction 74 which is connected through capacitor C4 to ground terminal G. Junction 74 is connected to junction 76 which is connected to the positive input of amplifier U1 and also to resistor R7 which is connected to toroidal coil terminal 40.

Amplifier U1 receives power at pin 4 thereof and has the negative input thereof connected to junction 78 which is connected to resistor R8 through junction 42 and also is connected junction 80. Junction 80 is connected through resistor R10 and junction 82 to the output of U1 at junction 84 and is also connected through resistor R9 to grounding terminal G. Capacitor C6 is connected between resistor R9 and 82.

The output of amplifier U1 is connected through capacitor C7 and resistor R11 to the positive input of amplifier U2, which is also connected to resistor R10 and capacitor C13, which are connected to terminal G for grounding through switch contact 28. The negative input of amplifier U2 is connected through resistor R12 to terminal G and also to junction 86 which is connected through resistor R13, and capacitor C8 in parallel therewith, to the output of U2 at junction 88.

The output of amplifier U2 at junction 88 is connected through resistor R14 and R15 to the positive input of comparator U3 within the detection and latching portion 50 of circuit. Capacitor C9 is connected to a junction intermediate resistors R14 and 15 and is connected to the terminal G for grounding through switch 16. The negative terminal of comparator U3 receives an input from junction 90 through resistor R16; and, junction 90 is biased through resistor R17 by the voltage $P_1$ Junction 90 is also connected through resistor R18 to junction 92 which is connected to the output of a second comparator U4; and, junction 92 is also connected through resistor R19 to ground terminal G.

Comparator U4 receives a signal through resistor R20 from junction 94 which is biased through diode CR4 and resistor R21 by the voltage $P_1$. Junction 94 is also connected through capacitor C10 to ground terminal G. The negative input of comparator U4 is connected to junction 96. Junction 96 is connected through resistor R24 to ground terminal G; and, junction 96 also receives power from the B+supply through series connection with "EXPRESS" switch 98, resistor R22 and diode CR6.

EXPRESS switch 98 is mechanically connected to a "DOWN" switch 100 which connects power from the B+ supply to junction 56 upon manual actuation thereof by the vehicle occupant. In the presently preferred practice, switches 98, 100 are interconnected by a common manual actuator such that the vehicle user or occupant detects, by tactile sensing, an initial position for the actuator of switch 100; and, upon continued movement of the actuator (not shown) detects or senses the actuation of switch 98.

The output of comparator U3 is connected to junction 102 which is also connected through diode CR5 and resistor R23 to junction 96. Junction 96 is also connected through resistor 24 to terminal G. Junction 102 is also connected to the express interrupt portion 54 of the circuit through diode CR7 to junction 104. Junction 104 is also connected through diode CR8 and resistor R32 to junction 106 which is connected to the base of a switch Q1 of the relay driver portion 52 of the circuit. Junction 106 is also connected through diode CR9 and resistor R11 to the DOWN switch through junction 56.

Junction 106 is also connected to the collector of switch Q2 which has its emmitter connected to ground terminal G and the base thereof, connected through R13 to junction 108 of the express interrupt portion 54 of the circuit. Junction 108 is connected through diode CR10 to junction 110. The express interrupt portion of the circuit 54 receives power from junction 56 through resistor R14 and junction 112, which is connected through capacitor C12 to ground terminal G and through resistor R15 to the base of switch Q3. Switch Q3 has its emmitter connected to ground terminal G, which is grounded through switch 16; and, Q3 has its collector connected to junction 114 which receives power through resistor R30 from the power supply 48. The collector of Q3 is also connected to pin 1 of counter U5. Counter U5 receives power from power supply 48 through pin 14 thereof and provides an output at pin 12 thereof to junction 108, which is applied through junction 110 and resistor R26 to the base of switch Q4 which has its emitter grounded through terminal G; and, its collector is connected to junction 116 which receives power from power supply 48 through resistor R25. Junction 116 is also connected reset pin 2 of counter U5.

In the presently preferred practice, the counter U5 is obtained from SGS, Inc. located at 2340 Des Plaines Avenue, Suite 309 Des Plaines, Ill., 60018. It will be understood that although amplifiers U1 and U2 and comparators U3 and U4 are denoted by separate reference numerals, each of these devices comprises in the presently preferred practice one-fourth of an LM2904 device commercially available from National Semi-Conductor Corp., 2900 Semi-Conductor Drive, Santa Clara, Calif., 95051; and, transient suppressor CR12 is preferably an V27ZA1 device commerically available from GE Solid State, Route 202 Sommerville, N.J. 08876.

The values of resistances, capacitances and designations for solid state devices are provided in Table I listed here below.

TABLE I

| R | Ohms | C | u Farads | Device | Type |
|---|---|---|---|---|---|
| 1,2 | 200 | 1 | 10,35V | CR1 | 1N4747 |
| 3 | 3.3K | 2 | 0.1 100V | CR2–4 | 1N4004 |
| 4 | 30K | 3 | 0.1,100V | CR5 | 1N914 |
| 5,6 | 100K | 4 | 470,pf,25V | CR6 | 1N4004 |
| 7,8 | 3.3K | 5 | .001,25V | CR7,10 | 1N914 |
| 9,10 | 100K | 6 | 470pf,25V | CR8,9 | 1N4004 |

TABLE I-continued

| R | Ohms | C | u Farads,25V | Device | Type |
|---|---|---|---|---|---|
| 11,12 | 3K | 7 | 0.1,25V | CR11 | 1N4004 |
| 13,27 | 150K | 8 | 100pf,25V | U1-4 | LM2904 |
| 14 | 51K | 9 | 2.2,25V | U5 | 4024B |
| 15,16 | 9.1K | 10 | 10.35V | Q1-4 | MMBTA06 |
| 17 | 18K | 11 | .001 | CR12 | V27ZA1 |
| 18 | 150K | 12 | 0.1,25V | | |
| 19 | 51K | 13 | 100pf,25V | | |
| 20–23 | 9.1K | | | | |
| 24,26 | 100K | | | | |
| 25 | 22K | | | | |
| 28 | 1 Meg | | | | |
| 29 | 51K | | | | |
| 30 | 10K | | | | |
| 31,34 | 100K | | | | |
| 32,33 | 3.9K | | | | |

In operation, of the embodiment of FIG. 1, movement by the user of switch 100 to the closed position applies a voltage to the base of switch Q1 which conducts via terminal G and junction 14 to ground through contact 28 of the open switch 18. Current flow through relay coil 25 closes switch 32 against the contact 22 permitting current to flow through junction 34 and lead 36 to the motor 12 which is grounded through junction 14 and contact 28 of switch 16.

In the embodiment of FIG. 1, the DOWN switch 100 has a second position detected by tactile feel of the operator which causes the switch 98 to close for "EXPRESS" mode of operation. Upon movement of the actuator for switch 100 to the second position by tactile feel, the "EXPRESS" switch 98 is closed applying B+ power through junction 96 to the negative terminal of comparator U4 which causes U4 to latch comparator U3 to go "HIGH" to maintain Q1 to the ON state to keep power to relay coil 25 and hold switch 32 against contact 22 for powering the motor.

Rotation of the armature of the direct current motor 12 creates a counter-EMF and perturbations in the line current through lead 36, these perturbations being detected by toroidal coil 38 as positive and negative fluctuations in the voltage applied to the positive and negative inputs of amplifier U1. These fluctuations are amplified through amplifiers U1 and U2 and applied to the positive input of comparator U3 which conducts or goes "HIGH" to junction 102 maintaining Q1 in the "ON" condition. Upon the window reaching lower limit of window travel, the motor rotor stalls and absence of any further perturbations is sensed by coil 38 which causes comparator U3 to go "LOW" thereby driving junction 102 and 106 to a low condition and turning Q1 to the "OFF" state thereby stopping current flow through coil 25 and causing switch 32 to go to the open position against contact 44 to cut OFF current to the motor.

When $P_1$ is powered up after actuation of EXPRESS or normal DOWN C9 is charged up through the one megohm resistor and upon timeout of a predetermined interval, as for example, 20 seconds the positive input of U4 is "higher" than the negative input of U4 and the output of U4 goes "HIGH". This causes the nagative input of U3 to go high and the U3 output to go "LOW" resulting in $Q_1$ turning OFF terminating current to coil 25. This function thus terminates motor current in the event of a malfunction in the motor drive train for the window mechanism. When EXPRESS switch 98 has been closed, the motor is operated continuously until armature stall occurs and coil 38 senses such stall and causes the output of comparator U3 to go "LOW" and switch Q1 to the OFF state.

During the EXPRESS mode of operation, subsequent activation of the UP switch 16 applies the positive voltage through junction 14 to the ground connector G, and switches Q4 OFF, which in turn switches Q2 OFF to turn Q1 to the OFF position and thereby terminates motor function.

Whenever the DOWN switch is activated, U5 gets a count pulse, but it does not count unless pin 2 of U5 has been reset and "held" LOW by Q5, which is only conducting when EXPRESS mode is activated. When the circuit is in the EXPRESS mode and the DOWN switch is activated, U5 counts, pin 12 goes HIGH causing Q2 to conduct and turn Q1 to the OFF position terminating current to the coil 25 and thereby terminating motor function.

Normal UP operation of the window lift motor is accomplished by manual closing and holding of switch 16 against contact 18 to apply B+ voltage through junction 14 to the motor, in reverse polarity with respect to switch 32, to accomplish rotation of the motor in the reverse direction to provide the window lift in the UP direction.

Referring to FIG. 2, an alternative embodiment of the invention is illustrated generally at 120 as having an amplification section 122, a Detecting and Latch section 124, power supply 126 and an Express Interrupt and Coil Driver section 128. The various components of the circuit section 126, 122, 124, and 128 are grounded through connector G' which is the common terminal of the switch 130 which in the open position is grounded to the vehicle battery ground through switch contact 132.

The function of the circuit portion 122 is similar to that of portion 46 of the FIG. 1 embodiment in the coil 38' senses perturbations in the motor current line 36' and provides an output from the dual amplifier comprising separate halves of device U6 with the output applied to junction 134 from pin 1 of U6. The coil 38' provides inputs through resistors R42, R43 respectively to the positive input at pin 5 of the first half of U6 and the negative input at pin 6.

The output of the second half of amplifier U6 through junction 134 is applied to the positive input at pin 5 of one half of a dual comparator U7 which has its negative input connected through junction 136 to receive the voltage $P_1$ from power supply 126. The remaining half of comparator U7 has its output through pin 1 thereof connected through resistor R52 to junction 136 with the positive input pin 3 thereof connected to receive the voltage $P_1$ through resistor R54 and R55 at junction 138 which is also grounded through capacitor C24. The negative input of U7 receives at pin 2 the output from pin 7 of the first half of comparator U7 from junction 140 through diode CR18 and resistor R58.

The comparator output at junction 140 is also applied through diode CR19, and resistor R61 and junction 142 to the base of transistor switch Q5 which has its emitter grounded through terminal G' and its collector connected through resistor 62 to coil terminal 144 of the coil 145 in relay RY2. The opposite terminal 146 of the coil 145 is connected to receive the voltage B+ from the onboard vehicle primary battery.

Junction 142 is connected through resistor R60 to one side of "EXPRESS" switch 148 and the other side of the switch is connected to junction 146 to receive the B+ voltage. The open side of switch 148 is connected through resistor R57 and diode CR16 to the negative input at pin 2 of comparator U7.

A manually user actuated "DOWN" switch 150 is separately provided and has one contact thereof grounded with the opposing contact 152 connected to the B+ junction 146.

Relay RY2 has a switch 154 which in the unactuated state is closed against contact 156 to provide a path to ground from junction 34'. In the actuated state, upon electrical current flowing through the coil 145 of relay RY2, switch 154, moves against contact 158 to apply the B+voltage through lead 36' to junction 34' to the motor 12' which has its opposite lead grounded through contact 132 of the UP switch 130.

In operation, upon closure of EXPRESS switch 148, comparator U7 latches ON and causes Q5 to conduct, thereby effecting current flow through the coil 145 of relay RY2 and closing switch 154 against the contact 158 to apply power continuously through lead 36' and junction 34' lead 36' to the motor 12' for continuous operation of the motor in the DOWN mode. Upon the window being lowered to the lower limit position, the motor armature stalls and the loss of perturbations in and motor power lead 36' is sensed by coil 38' which unlatches the comparator network 124 to cause Q5 to cease conducting and open relay switch 154 to cut motor current. The value of resistances, capacitances and description of other devices is set forth in Table II as follows:

TABLE II

| R | Ohms | C | u Farads | Device | Type |
|---|---|---|---|---|---|
| 35 | 200,¼W | 14 | 10.35V | CR13 | 1N4004 |
| 36 | 30K | 15 | 0.1,100V | CR14 | 20V,1W |
| 37,42,43 | 3.3K | 16 | 470pf,25V | CR15 | 1N4004 |
| 38–41 | 100K | 17 | .001,25V | CR16 | 1N4004 |
| 44,45 | 3.0K | 18 | 470pf,25V | CR17 | MMBZA747 |
| 46,47 | 150K | 19 | 0.1,25V | CR18 | MMBD914 |
| 48 | 51K | 20,21 | 100pf,25V | CR19 | 1N4004 |
| 49,50 | 9.1K | 22 | 2.2,25V | Q5 | MMBTA06 |
| 51 | 18K | 23 | .001,25V | U6–9 | LM2904 |
| 52 | 620 | 24 | 10.35V | | |
| 53 | 51K | 25 | .01,100V | | |
| 54 | 1 Meg | 26 | 0.1,100V | | |
| 55–58 | 9.1K | | 0.1,100V | | |
| 59 | 100K | | | | |
| 60,61 | 3.9K | | | | |
| 62 | 20 | | | | |

If during the EXPRESS mode of operation, it is desired to interrupt the lowering of the window, a momentary actuation of UP switch 130 causes the motor to lose its ground and causes current flow to the motor to cease. Although the EXPRESS switch in the embodiment of FIG. 2 has been illustrated as a separate switch 148, it will be understood that switch 148 may be coupled for actuation by a common actuator in with the actuator for manual DOWN switch 150.

The present invention thus provides a unique and novel control system for automatic window lift motors for the windows of passenger vehicles. The system of the present invention provides an operational mode for the window to provide a continuous lowering or EX-PRESS mode of operation which may be terminated by momentary actuation of either the manual UP or DOWN switch. In a second embodiment, the EXPRESS mode of operation is interrupted by momentary actuation of the UP switch. In both embodiments, the EXPRESS switch electronically latches a relay ON through a transistor switch; and, subsequent movement of the UP switch releases the latches, opens the relay and stops motor operation. Window travel limit is effected by a toroidal coil which senses perturbations in the motor current line due to motor armature rotation; and, cessation of the perturbations in the toroidal coil is operative through a comparator to switch OFF the transistor switch for releasing a motor relay.

Although the invention has hereinabove been described with respect to the illustrated embodiments, it will be understood that the invention is capable of alterations and modifications and is intended as limited only by the scope of the following claims.

I claim:
1. A control system for an electrically lifted vehicle door window comprising:
   (a) motor means operable for forward and reverse rotation and adapted for raising and lowering a door window in a vehicle;
   (b) coil means disposed adjacent a power lead of said motor means and operative to sense motor current;
   (c) first circuit means receiving a signal from said coil means and operative in response thereto for switching off said motor means when said coil means senses a motor current stall condition;
   (d) first switch means operable upon user actuation in one direction to a first tactilely senses position to switch power to said motor means only so long as said first switch means is held in said first position, said first switch means further actuatable in said one direction to a second tactilely sensed position;
   (e) second switch means user actuatable in a direction opposite said one direction to a third position;
   (f) second circuit means responsive to instantaneous actuation of said first switch means to said second position and operative thereupon to provide continuous energization of said motor means for down limit lowering of said window upon release of said instantaneous second position actuation; and,
   (g) actuation of said second switch means to said third position thereupon to reverse polarity to said second circuit means to disable said continuous motor energization.

2. The control system defined in claim 1, wherein said first circuit means includes comparator means.

3. The control system defined in claim 2, wherein said second circuit means includes relay means.

4. The control system defined in claim 2, therein said second circuit means includes relay means and comparator means.

5. The control system defined in claim 1, wherein said third circuit means includes relay means, solid state switch means and comparator means.

* * * * *